(12) United States Patent
Yang et al.

(10) Patent No.: US 11,920,010 B2
(45) Date of Patent: *Mar. 5, 2024

(54) HEAT-SEALABLE POLYESTER FILM (71) Applicant: NAN YA PLASTICS CORPORATION, Taipei (TW)

(72) Inventors: Wen-Cheng Yang, Taipei (TW); Te-Chao Liao, Taipei (TW); Chun-Cheng Yang, Taipei (TW); Chia-Yen Hsiao, Taipei (TW); Ching-Yao Yuan, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 36 days.

This patent is subject to a terminal disclaimer.

(21) Appl. No.: 17/409,805

(22) Filed: Aug. 24, 2021

(65) Prior Publication Data
US 2022/0243018 A1 Aug. 4, 2022

(30) Foreign Application Priority Data

Jan. 29, 2021 (TW) ................. 110103439

(51) Int. Cl.
*C08J 5/18* (2006.01)
*B32B 27/08* (2006.01)
(Continued)

(52) U.S. Cl.
CPC . *C08J 5/18* (2013.01); *C08J 3/22* (2013.01); *C08J 11/06* (2013.01); *C08J 11/10* (2013.01); *B32B 27/08* (2013.01); *B32B 27/36* (2013.01); *B32B 2250/02* (2013.01); *B32B 2250/24* (2013.01); *B32B 2250/244* (2013.01); *B32B 2307/31* (2013.01); *B32B 2307/50* (2013.01); *B32B 2307/558* (2013.01); *B32B 2367/00* (2013.01); *C08J 2367/02* (2013.01);
(Continued)

(58) Field of Classification Search
None
See application file for complete search history.

(56) References Cited

U.S. PATENT DOCUMENTS

| 5,374,467 A | 12/1994 | Sato |
| 5,972,445 A * | 10/1999 | Kimura ................ B32B 27/36 |
| | | 428/347 |

(Continued)

FOREIGN PATENT DOCUMENTS

| CN | 1338989 | 3/2002 |
| CN | 1727379 | 2/2006 |

(Continued)

OTHER PUBLICATIONS

"Search Report of Europe Counterpart Application", dated Feb. 28, 2022, p. 1-p. 7.

(Continued)

*Primary Examiner* — Vivian Chen
(74) *Attorney, Agent, or Firm* — JCIPRNET (57) ABSTRACT

The disclosure discloses a heat-sealable polyester film, including a base layer and a heat-seal layer formed on the base layer. The heat-seal layer includes a physically regenerated polyester resin, a chemically regenerated polyester resin, and a modifier. The heat-sealable temperature of the heat-sealable polyester film is between 100° C. and 230° C.

6 Claims, 2 Drawing Sheets

(51) Int. Cl.
  *B32B 27/36* (2006.01)
  *C08J 3/22* (2006.01)
  *C08J 11/06* (2006.01)
  *C08J 11/10* (2006.01)
  *C08L 67/00* (2006.01)
  *C08L 67/02* (2006.01)
  *C08L 67/03* (2006.01)

(52) U.S. Cl.
  CPC .............. *C08L 67/00* (2013.01); *C08L 67/02* (2013.01); *C08L 67/03* (2013.01); *C08L 2203/16* (2013.01); *C08L 2203/162* (2013.01); *C08L 2205/025* (2013.01); *C08L 2207/20* (2013.01); *Y02W 30/62* (2015.05); *Y10T 428/2826* (2015.01); *Y10T 428/31786* (2015.04)

(56) References Cited

U.S. PATENT DOCUMENTS

| | | | |
|---|---|---|---|
| 7,229,581 | B2 | 6/2007 | Kern et al. |
| 10,639,873 | B1* | 5/2020 | Murga ................ B32B 27/20 |
| 11,572,449 | B2* | 2/2023 | Liao .................. B29C 48/022 |
| 2002/0150751 | A1* | 10/2002 | Murschall ............ G09F 15/02 428/480 |
| 2003/0099846 | A1* | 5/2003 | Murschall ............ B32B 27/36 428/44 |
| 2010/0068355 | A1* | 3/2010 | Berry ................... B32B 27/36 426/396 |
| 2013/0052401 | A1 | 2/2013 | Snyder et al. |
| 2019/0337274 | A1* | 11/2019 | Puthanparambil ...... B32B 27/22 |
| 2021/0024718 | A1 | 1/2021 | Fang et al. |
| 2021/0047493 | A1* | 2/2021 | Liao .................. B29B 17/0036 |
| 2021/0316493 | A1* | 10/2021 | Mamak ................. B32B 3/263 |
| 2021/0332198 | A1* | 10/2021 | Liao ..................... C08J 11/24 |
| 2021/0332199 | A1* | 10/2021 | Liao ..................... B32B 27/18 |
| 2021/0332200 | A1* | 10/2021 | Liao ..................... C08K 3/042 |
| 2021/0332213 | A1* | 10/2021 | Liao ..................... C08K 5/098 |
| 2021/0332214 | A1* | 10/2021 | Liao ..................... C08K 3/22 |
| 2022/0017707 | A1* | 1/2022 | Yang .................. C08G 63/692 |
| 2022/0017708 | A1* | 1/2022 | Yang .................... B32B 27/308 |
| 2022/0017709 | A1* | 1/2022 | Yang ..................... C08J 11/24 |
| 2022/0017769 | A1* | 1/2022 | Yang ..................... C08J 11/06 |
| 2022/0017770 | A1* | 1/2022 | Yang .................... B32B 27/16 |
| 2022/0041835 | A1* | 2/2022 | Liao ...................... C08J 5/18 |
| 2022/0193971 | A1* | 6/2022 | Yang ..................... B29D 7/01 |
| 2022/0243029 | A1* | 8/2022 | Yang ..................... C08J 11/24 |
| 2022/0243030 | A1* | 8/2022 | Yang ..................... C08J 11/10 |
| 2022/0243031 | A1* | 8/2022 | Yang ...................... C08J 5/18 |
| 2022/0243032 | A1* | 8/2022 | Yang .................... B29C 48/08 |
| 2022/0314589 | A1* | 10/2022 | Kudo ..................... B32B 7/12 |
| 2022/0363890 | A1* | 11/2022 | Liao ..................... C08L 67/00 |
| 2022/0403124 | A1* | 12/2022 | Shimizu ............... B29C 55/143 |
| 2023/0139647 | A1* | 5/2023 | Osamu .................. C08J 7/0423 428/36.6 |

FOREIGN PATENT DOCUMENTS

| | | | |
|---|---|---|---|
| CN | 101747601 | | 6/2010 |
| CN | 102089364 | | 6/2011 |
| CN | 110337365 | | 10/2019 |
| JP | H01237138 | | 9/1989 |
| JP | H05222275 | | 8/1993 |
| JP | 2002248727 | | 9/2002 |
| JP | 2007160933 | | 6/2007 |
| JP | 2011-256328 A | * | 12/2011 |
| JP | 2011256328 | | 12/2011 |
| JP | 2015108081 | | 6/2015 |
| KR | 20000021786 | | 4/2000 |
| TW | 201117951 | | 6/2011 |
| TW | 201707930 | | 3/2017 |
| TW | 201905030 | | 2/2019 |

OTHER PUBLICATIONS

"Office Action of Japan Counterpart Application", dated Nov. 1, 2022, pp. 1-4.

"Search Report of Europe Counterpart Application", dated Sep. 26, 2023, p. 1-p. 5.

"Office Action of China Counterpart Application", dated Dec. 4, 2023, p. 1-p. 9.

* cited by examiner

HEAT-SEALABLE POLYESTER FILM

CROSS-REFERENCE TO RELATED APPLICATION

This application claims the priority benefit of Taiwan application serial no. 110103439, filed on Jan. 29, 2021. The entirety of the above-mentioned patent application is hereby incorporated by reference herein and made a part of this specification.

BACKGROUND

Technical Field

The disclosure relates to a heat-sealable polyester film, in particular to a heat-sealable polyester film prepared by using a recycled polyester material.

Description of Related Art

The most common recycling method for waste PET bottles is the physical recycling method (or mechanical recycling method). The physical recycling method is mainly to pulverize waste PET bottle materials by a physical mechanical means; then placing the pulverized PET bottle materials in a high-temperature environment for melting; then pelletizing the molten PET bottle materials to form physically regenerated polyester chips. The physically regenerated polyester chips may be used in subsequent processing operations.

The physically regenerated polyester chips produced by the physical recycling method usually have higher intrinsic viscosity (IV). To adjust the intrinsic viscosity of the physically regenerated polyester chips is mainly used solid-state polymerization. However, the solid-state polymerization method may only be used to increase the intrinsic viscosity of the physically regenerated polyester chips, and may not be used to reduce the intrinsic viscosity of the physically regenerated polyester chips. In addition, the general film-making process usually has certain limitations on the intrinsic viscosity range of polyester chips. The physically regenerated polyester chips produced by the physical recycling method are generally only suitable for bottle blowing and spinning processes, and not suitable for film extrusion.

To make the physically regenerated polyester chips suitable for a film-making process is mixed the physically regenerated polyester chips and additional virgin polyester chips to reduce the overall intrinsic viscosity of the polyester materials. However, this method is not able to effectively increase the proportion of the recycled polyester material in the heat-sealable polyester film, and therefore the final heat-sealable polyester film product may not meet the demands of environmental protection. In other words, there is a certain limitation in the proportion of recycled polyester in the current heat-sealable polyester film that needs to be overcome.

SUMMARY

The disclosure is to provide a heat-sealable polyester film to overcome the shortcomings of the technology.

The disclosure is to provide a heat-sealable polyester film including: a base layer; and a heat-seal layer formed on at least one side surface of the base layer, wherein the heat-seal layer is formed by a polyester composition, and the polyester composition includes: a physically regenerated polyester resin formed by physically regenerated polyester chips, wherein the physically regenerated polyester chips have a first intrinsic viscosity; a chemically regenerated polyester resin formed by chemically regenerated polyester chips, wherein the chemically regenerated polyester chips have a second intrinsic viscosity less than the first intrinsic viscosity; and a modifier dispersed in the physically regenerated polyester resin and the chemically regenerated polyester resin; wherein the physically regenerated polyester resin, the chemically regenerated polyester resin, and the modifier are mixed according to a predetermined intrinsic viscosity, so that the heat-seal layer has the predetermined intrinsic viscosity, and the modifier is configured so that a heat-sealable temperature of the heat-sealable polyester film is between 100° C. and 230° C.

The predetermined intrinsic viscosity of the heat-sealable polyester film is between 0.5 dL/g and 0.75 dL/g.

An overall thickness of the heat-sealable polyester film is between 4 microns and 100 microns, a thickness of the heat-seal layer is between 0.5 microns and 50 microns, and a thickness of the heat-seal layer is between 3% and 50% of the overall thickness of the heat-sealable polyester film.

Based on a total weight of 100 mol % of the heat-sealable polyester film, a content of isophthalic acid in the heat-sealable polyester film is between 0.5 mol % and 40 mol %; and a storage modulus of the heat-sealable polyester film measured at 150±2° C. and 10 Hz is between $3.5 \times 10^9$ dyne/cm$^2$ and $6.5 \times 10^9$ dyne/cm$^2$.

The heat-sealable polyester film meets the following conditions: (i) based on a total weight of 100 wt % of the heat-sealable polyester film, a content of biomass-derived ethylene glycol in the heat-sealable polyester film is not more than 5 wt %; (ii) a haze of the heat-sealable polyester film is not more than 5%; (iii) a surface roughness (Ra) of the heat-sealable polyester film is between 1 nm and 100 nm; (iv) a dynamic friction coefficient of the heat-sealable polyester film is between 0.2 and 0.6; and (v) a heat-seal strength of the heat-sealable polyester film is between 2 N/15 mm and 30 N/15 mm.

The disclosure is to provide a heat-sealable polyester film including: a base layer and a heat-seal layer formed on at least one side surface of the base layer, and the heat-seal layer has a predetermined intrinsic viscosity; wherein a modifier is added to the heat-seal layer, and the modifier is configured so that a heat-sealable temperature of the heat-sealable polyester film is between 100° C. and 230° C.

The predetermined intrinsic viscosity of the heat-seal layer is between 0.5 dL/g and 0.75 dL/g.

Based on a total weight of 100 mol % of the heat-sealable polyester film, a content of isophthalic acid in the heat-sealable polyester film is between 0.5 mol % and 40 mol %; and a storage modulus of the heat-sealable polyester film measured at 150±2° C. and 10 Hz is between $3.5 \times 10^9$ dyne/cm$^2$ and $6.5 \times 10^9$ dyne/cm$^2$.

The heat-sealable polyester film meets the following conditions: (i) based on a total weight of 100 wt % of the heat-sealable polyester film, a content of biomass-derived ethylene glycol in the heat-sealable polyester film is not more than 5 wt %; (ii) a haze of the heat-sealable polyester film is not more than 5%; (iii) a surface roughness (Ra) of the heat-sealable polyester film is between 1 nm and 100 nm; (iv) a dynamic friction coefficient of the heat-sealable polyester film is between 0.2 and 0.6; and (v) a heat-seal strength of the heat-sealable polyester film is between 2 N/15 mm and 30 N/15 mm.

One of the beneficial effects of the disclosure is that in the heat-sealable polyester film and the method for manufacturing the same provided by the disclosure, via the technical solutions of "the physically regenerated polyester chips have a first intrinsic viscosity", "the chemically regenerated polyester chips have a second intrinsic viscosity less than the first intrinsic viscosity", and "the physically regenerated polyester resin, the chemically regenerated polyester resin, and the modifier are mixed according to a predetermined intrinsic viscosity, so that the heat-seal layer has the predetermined intrinsic viscosity", the polyester masterbatch material may be adjusted to have the predetermined intrinsic viscosity to be suitable for extrusion and a film-forming process to achieve a higher proportion of the recycled polyester masterbatch material.

In order to further understand the features and technical content of the disclosure, please refer to the following detailed description and figures of the disclosure. However, the provided figures are only used for reference and description, and are not used to limit the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

The following are specific embodiments to illustrate the implementation disclosed in the disclosure. Those skilled in the art may understand the advantages and effects of the disclosure from the content disclosed in this specification. The disclosure may be implemented or applied via other different specific embodiments, and various details in this specification may also be modified and changed based on different viewpoints and applications without departing from the concept of the disclosure. In addition, the figures of the disclosure are merely schematic illustrations, and are not drawn according to actual size. The following embodiments further describe the related technical content of the disclosure in detail, but the disclosed content is not intended to limit the scope of the disclosure.

It should be understood that, although terms such as "first", "second", and "third" may be used herein to describe various devices or signals, these devices or signals should not be limited by these terms. These terms are mainly used to distinguish one device from another device, or one signal from another signal. In addition, the term "or" used in this specification may include any one or a combination of a plurality of the associated listed items depending on the actual situation.

First Embodiment

Figure 1:
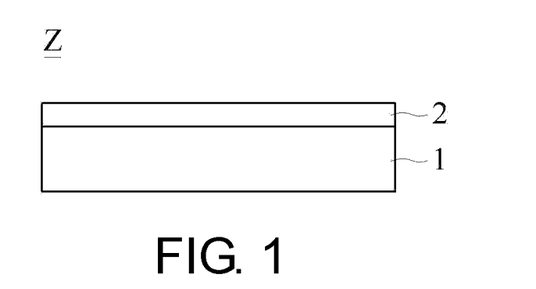
FIG. 1 is a schematic side view of a heat-sealable polyester film of the first embodiment of the disclosure.

Referring to FIG. 1, the first embodiment of the disclosure provides a heat-sealable polyester film Z, wherein the heat-sealable polyester film Z includes a base layer 1 and a heat-seal layer 2, and the heat-seal layer 2 is formed on at least one side surface of the base layer 1. In particular, the melting point of the heat-seal layer 2 is less than the melting point of the base layer 1. In this way, after two heat-sealable polyester films Z are laminated and hot-pressed, the heat-seal layers 2 with a lower melting point are melted and bonded together to achieve the heat-sealable effect.

It should be mentioned that, the terms "polyester", "polyester material", etc. herein refer to any type of polyester, especially aromatic polyester, and here in particular refers to the polyester derived from the copolymerization of terephthalic acid and ethylene glycol, namely polyethylene terephthalate (PET).

In the present embodiment, the overall thickness of the heat-sealable polyester film Z is between 4 microns and 100 microns, the thickness of the heat-seal layer 2 is between 0.5 microns and 50 microns (preferably between 0.5 microns and 10 microns), and the thickness of the heat-seal layer 2 is between 3% and 50% (preferably between 3% and 30%) of the overall thickness of the heat-sealable polyester film Z.

The base layer 1 is formed by a polyester composition, and the main component of the polyester composition is regenerated polyethylene terephthalate. Furthermore, the polyester composition includes a physically regenerated polyester resin and a chemically regenerated polyester resin. The main components of the physically regenerated polyester resin and the chemically regenerated polyester resin are each regenerated polyethylene terephthalate.

In particular, based on a total weight of 100 wt % of the base layer 1, the content of the physically regenerated polyester resin is between 50 wt % and 95 wt %, the content of the chemically regenerated polyester resin is between 1 wt % and 40 wt %, and the total content of the physically regenerated polyester resin and the chemically regenerated polyester resin is between 50 wt % and 100 wt %. It is worth mentioning that, in the present embodiment, the base layer 1 does not contain the modifier described below.

The heat-seal layer 2 is formed by a polyester composition, and the main component of the polyester composition is regenerated polyethylene terephthalate. Furthermore, the polyester composition includes a physically regenerated polyester resin, a chemically regenerated polyester resin, and a modifier. The main components of the physically regenerated polyester resin and the chemically regenerated polyester resin are each regenerated polyethylene terephthalate.

In particular, based on a total weight of 100 wt % of the heat-seal layer 2, the content of the physically regenerated polyester resin is between 50 wt % and 95 wt %, the content of the chemically regenerated polyester resin is between 1 wt % and 40 wt %, and the content of the modifier is between 0.1 wt % and 30 wt %; wherein the total content of the physically regenerated polyester resin and the chemically regenerated polyester resin is between 50 wt % and 100 wt %.

More specifically, the physically regenerated polyester resin is formed by physically regenerated polyester chips, and the physically regenerated polyester chips have a first intrinsic viscosity. The chemically regenerated polyester resin formed by chemically regenerated polyester chips, and the chemically regenerated polyester chips have a second intrinsic viscosity. In particular, the second intrinsic viscosity of the chemically regenerated polyester chips is less than the first intrinsic viscosity of the physically regenerated polyester chips.

More specifically, the first intrinsic viscosity of the physically regenerated polyester chips is preferably not less than 0.65 dL/g, and more preferably between 0.65 dL/g and 0.80 dL/g. Moreover, the second intrinsic viscosity of the chemically regenerated polyester chips is preferably not greater than 0.65 dL/g, and more preferably between 0.50 dL/g and 0.65 dL/g.

In the heat-seal layer 2, the modifier is dispersed in the physically regenerated polyester resin and the chemically regenerated polyester resin, and the modifier is at least one selected from the material group consisting of 1,4-butanediol, isophthalic acid, neopentyl glycol, and polybutylene terephthalate. The addition of the modifier may lower the melting point of the heat-seal layer 2, so that the heat-sealable polyester film Z may be heat-sealed in a temperature range of 100° C. to 230° C.

In particular, the physically regenerated polyester resin, the chemically regenerated polyester resin, and the modifier are mixed according to a predetermined intrinsic viscosity, so that the heat-seal layer 2 has the predetermined intrinsic viscosity. The predetermined intrinsic viscosity is preferably between 0.50 dL/g and 0.75 dL/g, and more preferably between 0.60 dL/g and 0.65 dL/g. Moreover, the heat-sealable temperature of the heat-sealable polyester film Z is between 100° C. and 230° C.

In an embodiment of the disclosure, the modifier is dispersed in the physically regenerated polyester resin and chemically regenerated polyester resin by modifying a polyester masterbatch. In particular, the modified polyester masterbatch is at least one of a physically regenerated modified polyester masterbatch and a chemically regenerated modified polyester masterbatch.

In other words, the physically regenerated modified polyester masterbatch includes the modifier, wherein the modifier in the physically regenerated modified polyester masterbatch is polybutylene terephthalate.

Moreover, the chemically regenerated modified polyester masterbatch includes the modifier, wherein the modifier in the chemically regenerated modified polyester masterbatch is the residue of at least one compound of 1,4-butanediol, isophthalic acid, and neopentyl glycol.

Moreover, the intrinsic viscosity of the physically regenerated modified polyester masterbatch is preferably not less than 0.65 dL/g, and more preferably between 0.65 dL/g and 0.80 dL/g. The intrinsic viscosity of the chemically regenerated modified polyester masterbatch is preferably not more than 0.65 dL/g, and more preferably between 0.50 dL/g and 0.65 dL/g, but the disclosure is not limited thereto.

Based on the above, the base layer 1 and the heat-seal layer 2 are respectively formed by a polyester composition, and these polyester compositions both include a physically regenerated polyester resin and a chemically regenerated polyester resin. It should be noted that the polyester composition forming the base layer 1 and the polyester composition forming the heat-seal layer 2 may be the same or different from each other, and the disclosure is not limited in this regard.

The heat-sealable polyester film Z of an embodiment of the disclosure is mixed with a physically regenerated polyester resin and a chemically regenerated polyester resin to significantly increase the proportion of the recycled polyester material in the base layer 1 and the heat-seal layer 2. Compared with the previous manufacturing method requiring the addition of a virgin polyester masterbatch, the heat-sealable polyester film Z of an embodiment of the disclosure may better achieve the effect of environmental protection and may solve the issue of many impurities produced from using only the physically regenerated polyester resin in the past.

More specifically, the physically regenerated polyester resin is formed by one or a plurality types of physically regenerated polyester chips, and the main component of the physically regenerated polyester chips is regenerated polyethylene terephthalate. The chemically regenerated polyester resin is formed by one or a plurality types of chemically regenerated polyester chips, and the main component of the chemically regenerated polyester chips is regenerated polyethylene terephthalate. The preparation methods of the physically regenerated polyester chips and the chemically regenerated polyester chips are described below.

According to the above configuration, the heat-sealable polyester film Z meets the following conditions: (i) based on a total weight of 100 wt % of the heat-sealable polyester film, the content of biomass-derived ethylene glycol in the heat-sealable polyester film is not more than 5 wt %; (ii) the haze of the heat-sealable polyester film is not more than 5%; (iii) the surface roughness (Ra) of the heat-sealable polyester film is between 1 nm and 100 nm; (iv) the dynamic friction coefficient of the heat-sealable polyester film is between 0.2 and 0.6; and (v) the heat-seal strength of the heat-sealable polyester film is between 2 N/15 mm and 30 N/15 mm.

Figure 4:
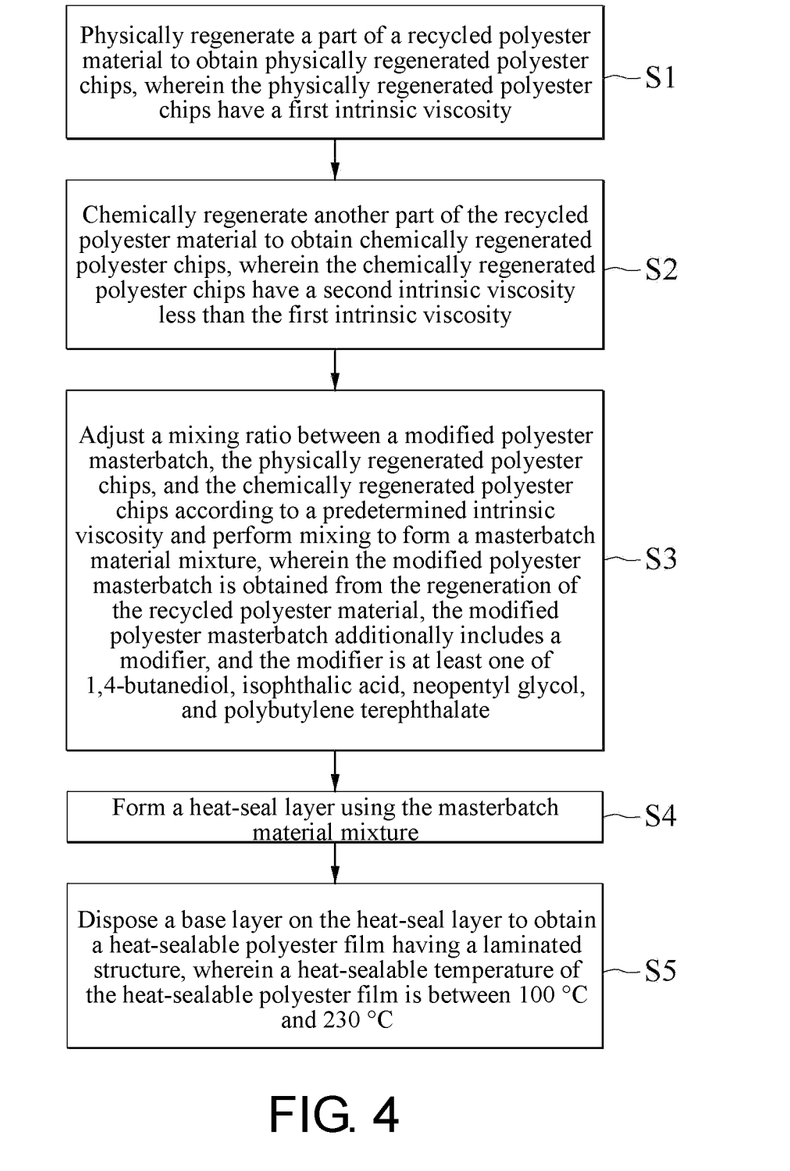
FIG. 4 is a step flowchart of the method for manufacturing a heat-sealable polyester film of the disclosure.

Please refer to FIG. 4. In the present embodiment, the method for manufacturing the heat-sealable polyester film includes steps S1 to S5. It should be noted that the sequence of the steps and the actual operation method described in the present embodiment may be adjusted according to requirements, and are not limited to those described in the present embodiment.

Step S1 includes: physically regenerating a part of a recycled polyester material to obtain physically regenerated polyester chips, wherein the physically regenerated polyester chips have a first intrinsic viscosity.

Specifically, the manufacturing steps of the physically regenerated polyester chips include: pulverizing a part of a recycled polyester material (such as recycled PET bottles (r-PET) bottle flakes) by a physical mechanical means to reduce the time and energy consumption required to melt the recycled polyester material. Next, the pulverized recycled polyester material is melted at a high temperature (for example, a high temperature between 230° C. and 270° C.), so that the recycled polyester material is in a molten state. Then, a first screen is used to filter the recycled polyester material in the molten state to remove solid impurities in the recycled polyester material. Lastly, the filtered recycled polyester material is pelletized to form the physically regenerated polyester chips.

In other words, the recycled polyester material is reshaped by cutting, melting, filtering, extruding, and the like in sequence in order to rearrange the polyester molecules in the original recycled polyester material, so as to prepare a plurality of the physically regenerated polyester chips.

Since the molecular weight of the recycled polyester material in the physical regenerating process is not changed significantly, the recycled polyester material has a relatively high viscosity in the molten state and has worse flow properties. Accordingly, if a screen with an insufficient mesh diameter is used, the issue of poor filter efficiency readily occurs.

In order to achieve a better filtering effect, in the present embodiment, the mesh diameter of the first screen is preferably between 10 microns and 100 microns. In other words, the first screen may screen out solid impurities with a particle size larger than the mesh diameter, but the disclosure is not limited thereto.

In the present embodiment, the physically regenerated polyester chips include physically regenerated "conventional" polyester chips that refer to polyester chips obtained by a physical regenerating method, and no functional additives are added. The main component of the physically regenerated polyester chips is regenerated polyethylene terephthalate. The first intrinsic viscosity of the physically regenerated polyester chips is preferably not less than 0.65 dL/g, and more preferably between 0.65 dL/g and 0.80 dL/g.

Moreover, in the process of physical regeneration, a functional additive (such as a slipping agent, a colorant, or a matting agent) may also be added to the molten mixture to prepare physically regenerated "functional" polyester chips with different functions, such as the following physically regenerated "modified" polyester chips.

It is worth noting that there are different suitable intrinsic viscosity ranges for different film-making processes. In general, the physically regenerated polyester chips (physically regenerated polyester resin) obtained by physical regeneration have a higher intrinsic viscosity (not less than 0.65 dL/g). If only the physically regenerated polyester chips (physically regenerated polyester resin) are used, the polyester masterbatch material is only suitable for bottle blowing and spinning processes, not for a film extrusion process.

To adjust the intrinsic viscosity of the physically regenerated polyester chips, is mainly adopting solid-state polymerization. However, the solid-state polymerization method may only be used to increase the intrinsic viscosity of the physically regenerated polyester chips, and may not be used to reduce the intrinsic viscosity of the physically regenerated polyester chips.

In order to solve the above issue, in an embodiment of the disclosure, chemically regenerated polyester chips (chemically regenerated polyester resin) are prepared by a chemical regenerating step in step S2 with a lower intrinsic viscosity (not greater than 0.65 dL/g). As a result, by using both the physically regenerated polyester chips and the chemically regenerated polyester chips at the same time, and adjusting the proportion of the physically and chemically regenerated polyester chips, the effect of adjusting the intrinsic viscosity of the polyester masterbatch material may be achieved, so that the polyester masterbatch material may be suitable for a film extrusion process.

Step S2 includes: chemically regenerating another part of the recycled polyester material to obtain chemically regenerated polyester chips, wherein the chemically regenerated polyester chips have a second intrinsic viscosity less than the first intrinsic viscosity.

Specifically, the manufacturing steps of the chemically regenerated polyester chips include: cutting or pulverizing another part of the recycled polyester material (such as r-PET bottle flakes) to reduce the time and energy consumption required to depolymerize the recycled polyester material. Then, the cut or pulverized regenerated polyester material is put into a chemical depolymerization solution to depolymerize the regenerated polyester material so as to form an oligomer mixture. Next, a second screen is used to filter the oligomer mixture to remove solid impurities in the recycled polyester material, thereby reducing the concentration of non-polyester impurities in the oligomer mixture.

Next, the oligomer mixture filtered by the second screen is subjected to an esterification reaction, and an inorganic additive or a copolymer monomer is added during the esterification reaction. Lastly, under specific reaction conditions, the oligomer mixture is repolymerized and pelletized to obtain the chemically regenerated polyester chips.

In particular, the liquid temperature of the chemical depolymerization solution may be, for example, between 160° C. and 250° C., but the disclosure is not limited thereto. Furthermore, the mesh diameter of the second screen is less than the mesh diameter of the first screen.

It should be mentioned that, the chemical depolymerization solution may cause chain scission to the polyester molecules in the recycled polyester material, so as to achieve the effect of depolymerization, and a polyester composition with shorter molecular chain and an ester monomer composed of one diacid unit and two diol units may be further obtained, such as bis(2-hydroxyethyl) terephthalate (BHET). That is, the molecular weight of the oligomer mixture is less than the molecular weight of the recycled polyester material.

In the present embodiment, the chemical depolymerization solution may be, for example, a solution of water, methanol, ethanol, ethylene glycol, diethylene glycol, or a combination thereof, but the disclosure is not limited thereto. For example, water is used for hydrolysis, and methanol, ethanol, ethylene glycol, or diethylene glycol is used for alcoholysis.

Moreover, it should be mentioned that, different from the physical regenerating step, the chemical regenerating step involves "depolymerization and repolymerization of polyester molecules in the recycled polyester material" to depolymerize the polyester molecules into molecules with smaller molecular weight and further repolymerize the molecules into a new polyester resin.

In the present embodiment, the chemically regenerated polyester chips include chemically regenerated "conventional" polyester chips that refer to polyester chips obtained by a chemical regenerating method, and no functional additives are added. The second intrinsic viscosity of the chemically regenerated polyester chips is preferably not greater than 0.65 dL/g, and more preferably between 0.50 dL/g and 0.65 dL/g.

Moreover, in the process of chemical regeneration, a functional additive above (such as a slipping agent, a colorant, or a matting agent) may also be added to the oligomer mixture, and then polymerization is performed again to prepare chemically regenerated "functional" polyester chips with different functions, such as the following chemically regenerated "modified" polyester chips.

Furthermore, due to the chemical recycling method, the recycled polyester material may be depolymerized into monomers with small molecular weight. Therefore, the impurities (such as colloidal impurities or other non-polyester impurities) originally present in the recycled polyester material (such as r-PET bottle flakes) may be more readily excluded by filtering compared to the physical recycling method.

Moreover, because the chemical regenerating operation may reduce the molecular weight of the recycled polyester material (such as forming polyester compositions and compound monomers with shorter molecular chains), the recycled polyester material has a lower viscosity after being depolymerized, and the flow properties thereof are better. Accordingly, the chemical regenerating operation may adopt a screen with a smaller mesh diameter to eliminate impurities with a smaller particle size in the polyester material.

In order to achieve a better filtering effect, in the present embodiment, the mesh diameter of the second screen is preferably between 1 micron and 10 microns. In other words, the second screen may screen out solid impurities with a particle size larger than the mesh diameter, but the disclosure is not limited thereto.

In terms of filtering solid impurities, the physical regenerating step may only filter and recycle solid impurities with a larger particle size in the polyester material, and the chemical regenerating step may filter and recycle solid impurities with a smaller particle size in the polyester material. Therefore, the production quality of the heat-sealable polyester film may be effectively improved.

Furthermore, the chemically regenerated polyester chips produced by the chemical regenerating step generally have a lower intrinsic viscosity. Moreover, the intrinsic viscosity of the chemically regenerated polyester chips is easier to control, and the intrinsic viscosity of the chemically regenerated polyester chips may be adjusted to be less than the intrinsic viscosity of the physically regenerated polyester chips.

Step S3 includes: adjusting the mixing ratio between a modified polyester masterbatch, the physically regenerated polyester chips, and the chemically regenerated polyester chips according to a predetermined intrinsic viscosity and performing mixing to form a masterbatch material mixture.

Therefore, the masterbatch material mixture mixed with the modified polyester masterbatch, the physically regenerated polyester chips, and the chemically regenerated polyester chips may have an intrinsic viscosity (for example, an intrinsic viscosity between 0.50 dL/g and 0.75 dL/g) suitable for a film-making process.

The modified polyester masterbatch is obtained from the regeneration of the recycled polyester material, the modified polyester masterbatch additionally includes a modifier, and the modifier is at least one of 1,4-butanediol, isophthalic acid, neopentyl glycol, and polybutylene terephthalate.

The masterbatch material mixture may be used to form a heat-seal layer 2. The modified polyester masterbatch may be prepared from the recycled polyester material by a physical regenerating method or a chemical regenerating method.

The modified polyester masterbatch is at least one of the chemically regenerated modified polyester masterbatch and the physically regenerated modified polyester masterbatch. The main component of the modified polyester masterbatch is regenerated polyethylene terephthalate, and the modified polyester masterbatch also includes: at least one of 1,4-butanediol, isophthalic acid, neopentyl glycol, and polybutylene terephthalate. Therefore, via the addition of the modified polyester masterbatch, the polyester composition forming the heat-seal layer 2 may include at least one of 1,4-butanediol, isophthalic acid, neopentyl glycol, and polybutylene terephthalate.

Specifically, the preparation step of the physically regenerated modified polyester masterbatch includes: melting the recycled polyester material to obtain a first molten mixture; adding polybutylene terephthalate to the first molten mixture to form a second molten mixture; reshaping the second molten mixture to obtain the physically regenerated modified polyester masterbatch.

The main component of the physically regenerated modified polyester masterbatch is regenerated polyethylene terephthalate, and the physically regenerated modified polyester masterbatch further includes polybutylene terephthalate. In particular, the physically regenerated modified polyester masterbatch includes 0 wt % to 30 wt % of polybutylene terephthalate.

Specifically, the preparation step of the chemically regenerated modified polyester masterbatch includes: depolymerizing the recycled polyester material to obtain a first oligomer mixture; adding at least one of 1,4-butanediol, isophthalic acid, and neopentyl glycol to the first oligomer mixture to form a second oligomer mixture; repolymerizing the second oligomer mixture to obtain the chemically regenerated modified polyester masterbatch.

The main component of the chemically regenerated modified polyester masterbatch is regenerated polyethylene terephthalate, and the chemically regenerated modified polyester masterbatch further includes residues of at least one of 1,4-butanediol, isophthalic acid, and neopentyl glycol. In particular, the chemically regenerated modified polyester masterbatch includes 0 weight percent to 30 weight percent of 1,4-butanediol residues, 0 weight percent to 30 weight percent of isophthalic acid residues, and 0 weight percent to 30 weight percent of neopentyl glycol residues.

The term "residue" as used herein refers to a group or unit derived from a specific compound from the result of a chemical reaction. In other words, the "residue of the diacid component" refers to a group derived from the diacid component in the polyester or copolyester synthesized by an esterification or polycondensation reaction; the "residue of the diol component" refers to a group derived from the diol component in the polyester or copolyester synthesized by an esterification or polycondensation reaction.

Step S4 includes: forming a heat-seal layer 2 using the masterbatch material mixture.

Step S5 includes: disposing a base layer 1 on the heat-seal layer 2 to obtain a heat-sealable polyester film Z having a laminated structure. In particular, the heat-sealable temperature of the heat-sealable polyester film Z is between 100° C. and 230° C.

The masterbatch material mixture may be formed into the heat-seal layer 2 by means of melt extrusion, for example. The base layer 1 and the heat-seal layer 2 may be formed into the heat-sealable polyester film Z by means of, for example, co-extrusion. Moreover, the predetermined intrinsic viscosity is preferably between 0.50 dL/g and 0.75 dL/g, and more preferably between 0.60 dL/g and 0.65 dL/g.

In step S3, the physically regenerated polyester chips prepared in step S1 and the chemically regenerated polyester chips prepared in step S2 are mixed to form a base material. The base material may be used to form a base layer 1. In this way, the heat-sealable polyester film Z of the present embodiment has a high proportion of recycled polyester. In other embodiments, the base layer 1 may also be other commercially-available polyester materials.

In step S4, the masterbatch material mixture prepared in step S3 and the base material prepared in step S3 are extruded by means of co-extrusion to form the heat-sealable polyester film Z.

The heat-sealable polyester film Z includes the heat-seal layer 2 formed by a masterbatch material mixture and the base layer 1 formed by a base material. In other embodiments, the method of preparing the heat-sealable polyester film Z is not limited to the means of co-extrusion, and the base layer 1 and the heat-seal layer 2 may also be formed separately first, and then the heat-seal layer 2 is disposed on the base layer 1.

In the present embodiment, the source of the recycled polyester material is recycled PET bottle flakes. The main material of PET bottle flakes is polyester. Generally speaking, polyester is formed by polycondensation of a diol unit and a diacid unit. In the recycled PET bottle flakes, the diol unit may include ethylene glycol from a petrochemical source or ethylene glycol from a biomass source. Therefore, for the polyester composition forming the base layer 1 and the heat-seal layer 2, based on a total weight of 100 wt % of the polyester composition, the polyester composition includes a biomass-derived material of not more than 5 wt %.

According to the above configuration, the method for manufacturing the heat-sealable polyester film of the present embodiment may be performed by using a high proportion of the recycled polyester material without the addition of a virgin polyester resin, or only a small amount of the virgin polyester resin needs to be added. For example, in an embodiment of the disclosure, the amount of the virgin polyester resin is usually not more than 50 parts by weight. Preferably, the virgin polyester resin is not more than 30 parts by weight, and more preferably, the virgin polyester resin is not more than 10 parts by weight.

In an embodiment of the disclosure, the physically regenerated polyester chips have a first acid value, the chemically regenerated polyester chips have a second acid value, and the second acid value is greater than the first acid value. In particular, the first acid value is between 10 mgKOH/g and 40 mgKOH/g, and the second acid value is between 20 mgKOH/g and 70 mgKOH/g. The method for measuring the acid value range is to use a titration method, which is performed with reference to the ASTM D7409-15 standard test method.

The characteristic of the method for manufacturing a heat-sealable polyester film of an embodiment of the disclosure is that the use of the physically regenerated polyester chips and the chemically regenerated polyester chips at the same time may improve the productivity of the film-making process, improve the physical properties of the heat-sealable polyester film, and reduce the production cost of the heat-sealable polyester film.

In an embodiment of the disclosure, based on a total weight of 100 mol % of the heat-sealable polyester film, the content of isophthalic acid in the heat-sealable polyester film is between 0.5 mol % and 40 mol %. Moreover, the storage modulus of the heat-sealable polyester film measured at 150±2° C. and 10 Hz is between $3.5 \times 10^9$ dyne/cm$^2$ and $6.5 \times 10^9$ dyne/cm$^2$. The storage modulus of the heat-sealable polyester film is the average value of the storage modulus of the heat-sealable polyester film in the MD direction and the TD direction measured by a dynamic viscoelasticity measuring apparatus.

Second Embodiment

Figure 2:
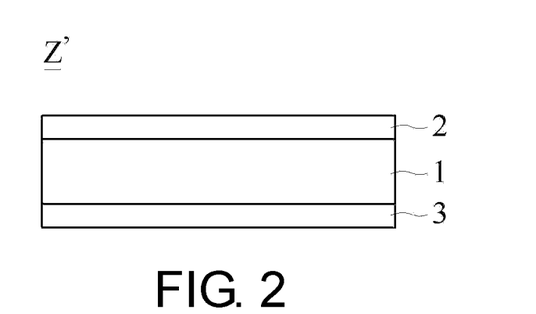
FIG. 2 is a schematic side view of a heat-sealable polyester film of the second embodiment of the disclosure.

Please refer to FIG. 2. The second embodiment of the disclosure also provides a heat-sealable polyester film Z'. The heat-sealable polyester film Z' includes a base layer 1 and two heat-seal layers 2 and 3, and the two heat-seal layers 2 and 3 are respectively formed on two opposite side surfaces of the base layer 1.

The material composition of the base layer 1 and the two heat-seal layers 2 and 3 of the present embodiment is substantially the same as that of the first embodiment, and is not repeated herein.

Third Embodiment

Figure 3:
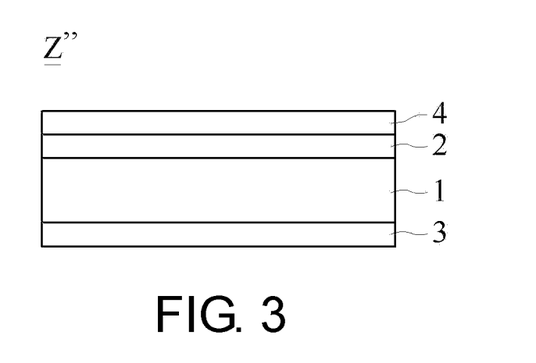
FIG. 3 is a schematic side view of a heat-sealable polyester film of the third embodiment of the disclosure.

Please refer to FIG. 3. The third embodiment of the disclosure also provides a heat-sealable polyester film Z". The heat-sealable polyester film Z" includes a base layer 1, two heat-seal layers 2 and 3, and an easy-bonding layer 4. The two heat-seal layers 2 and 3 are respectively formed on two opposite side surfaces of the base layer 1, and the easy-bonding layer 4 is formed on one of the side surfaces of the heat-seal layers 2 away from the base layer 1.

The materials of the base layer 1 and the heat-seal layers 2 and 3 in the third embodiment are substantially the same as those of the first embodiment, and are not repeated herein.

The easy-bonding layer 4 is formed by at least one of a water-based polyester resin, a water-based polyurethane resin, and a water-based acrylic resin, and a curing agent, so as to achieve the effect of easy ink bonding and good surface reworkability.

Advantages of the Embodiments

One of the beneficial effects of the disclosure is that in the heat-sealable polyester film and the method for manufacturing the same provided by the disclosure, via the technical solutions of "the physically regenerated polyester chips have a first intrinsic viscosity", "the chemically regenerated polyester chips have a second intrinsic viscosity less than the first intrinsic viscosity", and "the physically regenerated polyester resin, the chemically regenerated polyester resin, and the modifier are mixed according to a predetermined intrinsic viscosity, so that the heat-seal layer has the predetermined intrinsic viscosity", the polyester masterbatch material may be adjusted to have a predetermined intrinsic viscosity to be suitable for extrusion and a film-forming process and to achieve a higher proportion of the recycled polyester masterbatch material.

The content disclosed above is only the preferred and feasible embodiments of the disclosure, and does not limit the scope of the claims of the disclosure. Therefore, all equivalent technical changes made by using the specification of the disclosure and the content of the figures are all included in the scope of the claims of the disclosure.

What is claimed is:

1. A heat-sealable polyester film, comprising:
  a base layer; and
  a heat-seal layer formed on at least one side surface of the base layer, wherein the heat-seal layer is formed by a polyester composition, and the polyester composition comprises:
    a physically regenerated polyester resin formed by physically regenerated polyester chips, and the physically regenerated polyester chips have a first intrinsic viscosity;
    a chemically regenerated polyester resin formed by chemically regenerated polyester chips, and the chemically regenerated polyester chips have a second intrinsic viscosity less than the first intrinsic viscosity; and
    a modifier dispersed in the physically regenerated polyester resin and the chemically regenerated polyester resin;
  wherein the physically regenerated polyester resin, the chemically regenerated polyester resin, and the modifier are mixed according to a predetermined intrinsic viscosity, so that the heat-seal layer has the predetermined intrinsic viscosity, and the modifier is configured so that the heat-sealable temperature of the heat-sealable polyester film has a range between 100° C. and 230° C. for heat-sealing, based on a total weight of 100 wt % of the heat-seal layer, a content of the physically regenerated polyester resin is between 50 wt % and 95 wt %, and a content of the chemically regenerated polyester resin is between 1 wt % and 40 wt %.

2. The heat-sealable polyester film of claim 1, wherein the predetermined intrinsic viscosity of the heat-seal layer is between 0.5 dL/g and 0.75 dL/g.

3. The heat-sealable polyester film of claim 1, wherein based on a total weight of 100 mol % of the heat-sealable polyester film, a content of isophthalic acid in the heat-sealable polyester film is between 0.5 mol % and 40 mol %; and a storage modulus of the heat-sealable polyester film measured at 150±2° C. and 10 Hz is between $3.5\times10^9$ dyne/cm$^2$ and $6.5\times10^9$ dyne/cm$^2$.

4. A heat-sealable polyester film, comprising: a base layer and a heat-seal layer formed on at least one side surface of the base layer, and the heat-seal layer has a predetermined intrinsic viscosity; wherein a modifier is added to the heat-seal layer, the modifier is configured so that the heat-sealable temperature of the heat-sealable polyester film has a range between 100° C. and 230° C. for heat-sealing, and a physically regenerated polyester resin, a chemically regenerated polyester resin, and the modifier are mixed according to a predetermined intrinsic viscosity, based on a total weight of 100 wt % of the heat-seal layer, a content of the physically regenerated polyester resin is between 50 wt % and 95 wt %, and a content of the chemically regenerated polyester resin is between 1 wt % and 40 wt %.

5. The heat-sealable polyester film of claim 4, wherein the predetermined intrinsic viscosity of the heat-seal layer is between 0.5 dL/g and 0.75 dL/g.

6. The heat-sealable polyester film of claim 4, wherein based on a total weight of 100 mol % of the heat-sealable polyester film, a content of isophthalic acid in the heat-sealable polyester film is between 0.5 mol % and 40 mol %; and a storage modulus of the heat-sealable polyester film measured at 150±2° C. and 10 Hz is between $3.5\times10^9$ dyne/cm$^2$ and $6.5\times10^9$ dyne/cm$^2$.

\* \* \* \* \*